Feb. 6, 1973 A. MISKA ET AL 3,714,950
SPRAY APPARATUS
Filed May 12, 1971 3 Sheets-Sheet 2
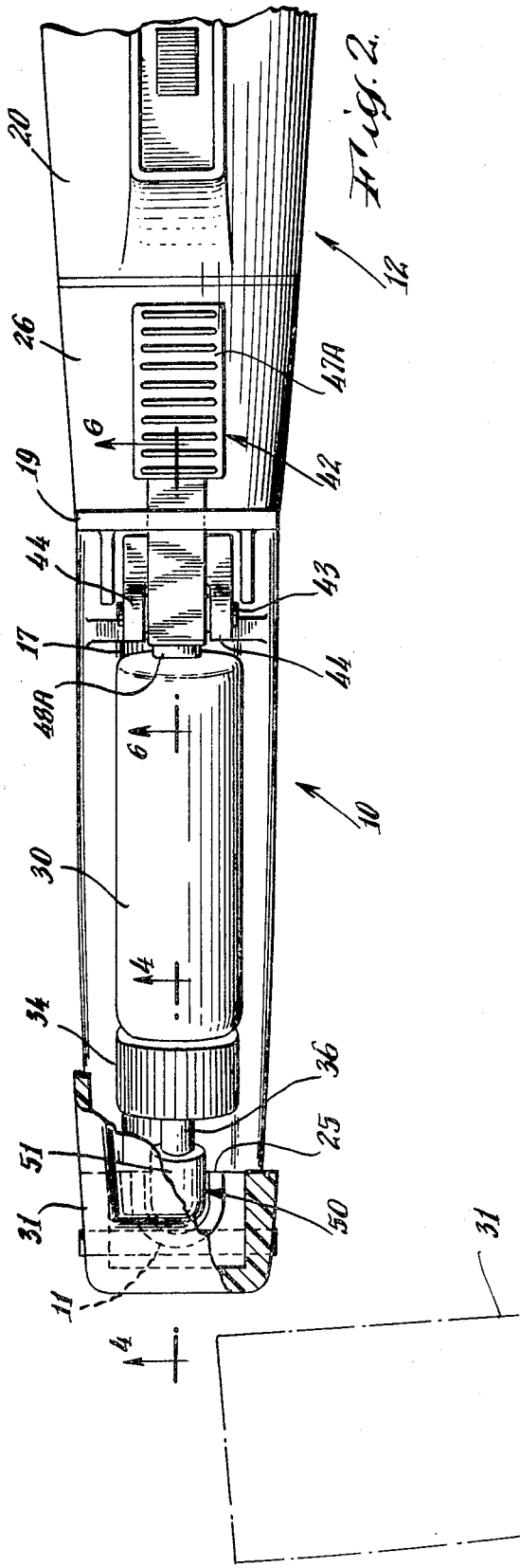
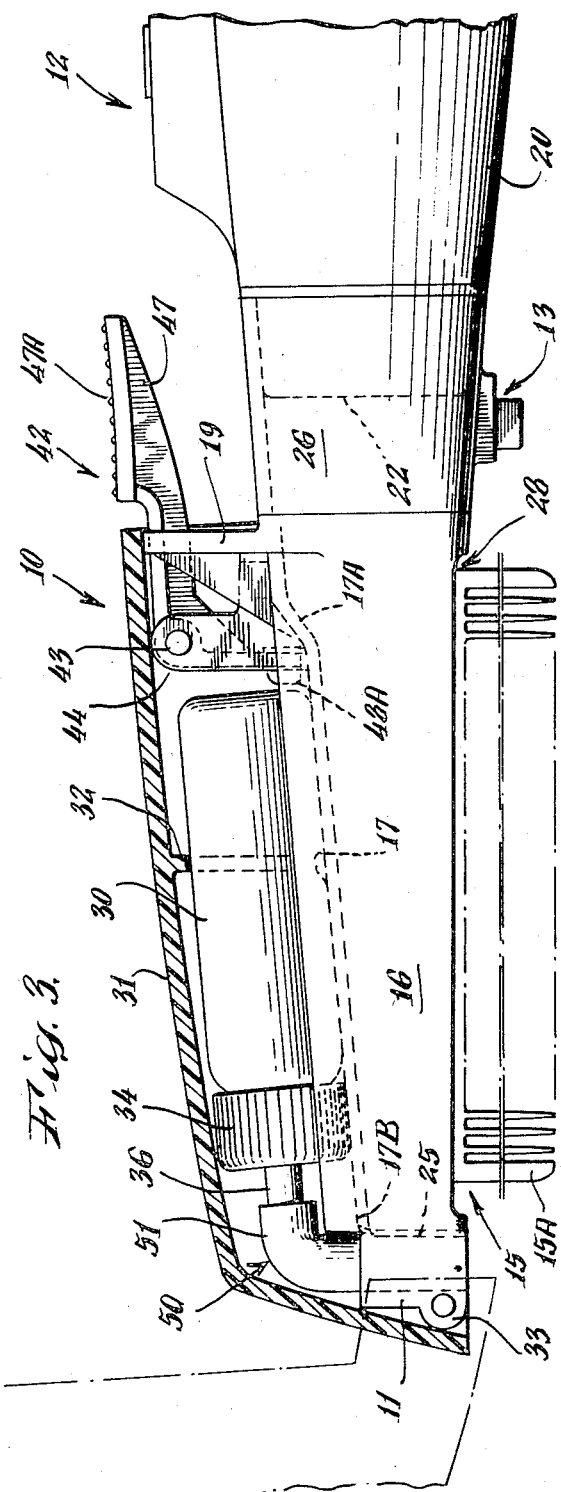
INVENTORS
Aivars Miska
Howard L. Selman
BY D. Walker
ATTORNEY

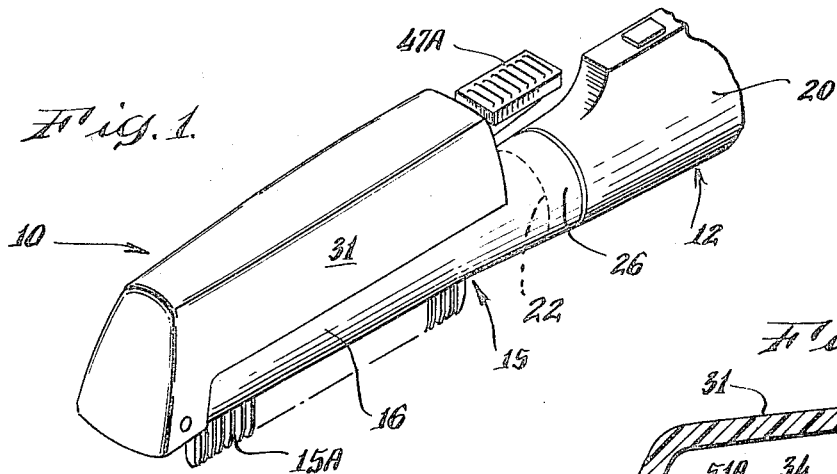
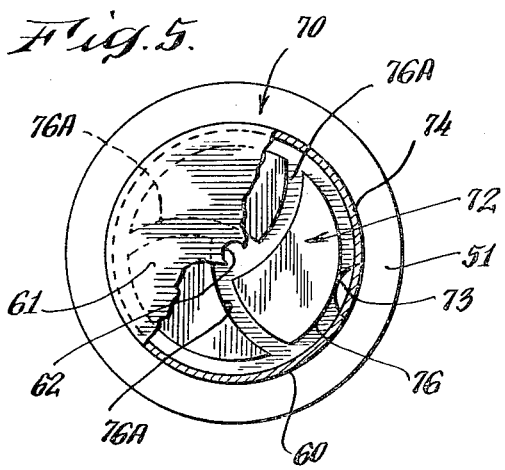
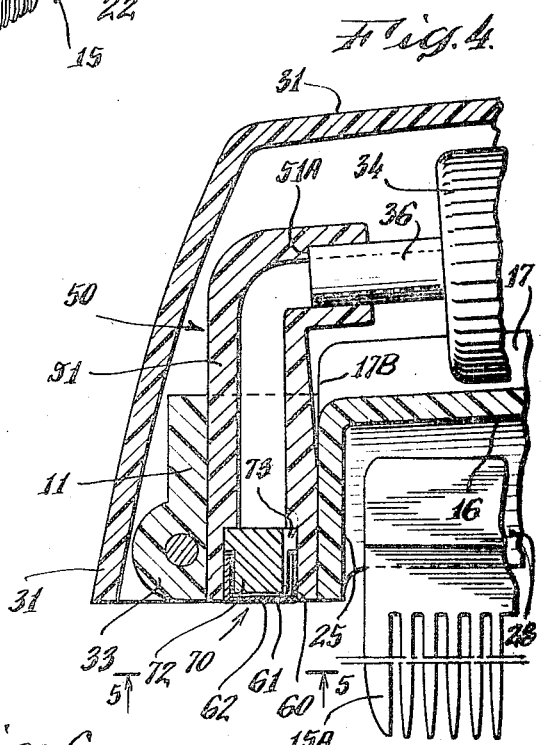
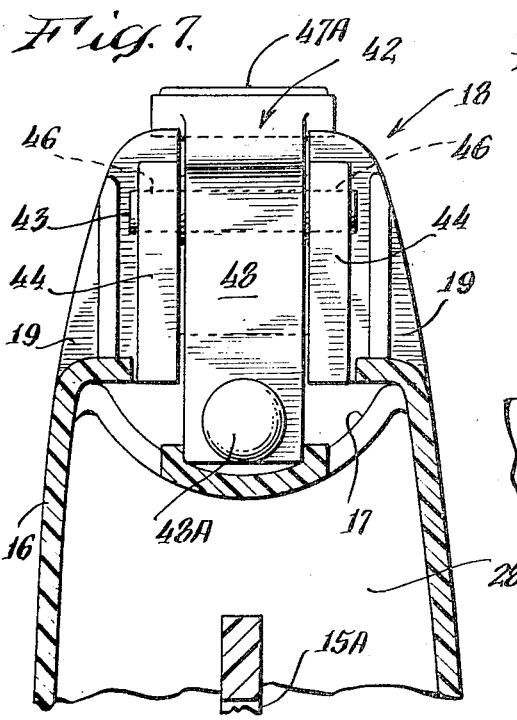
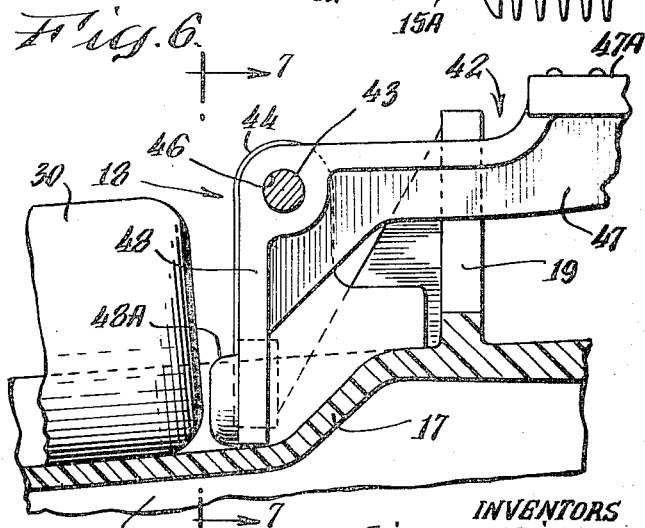

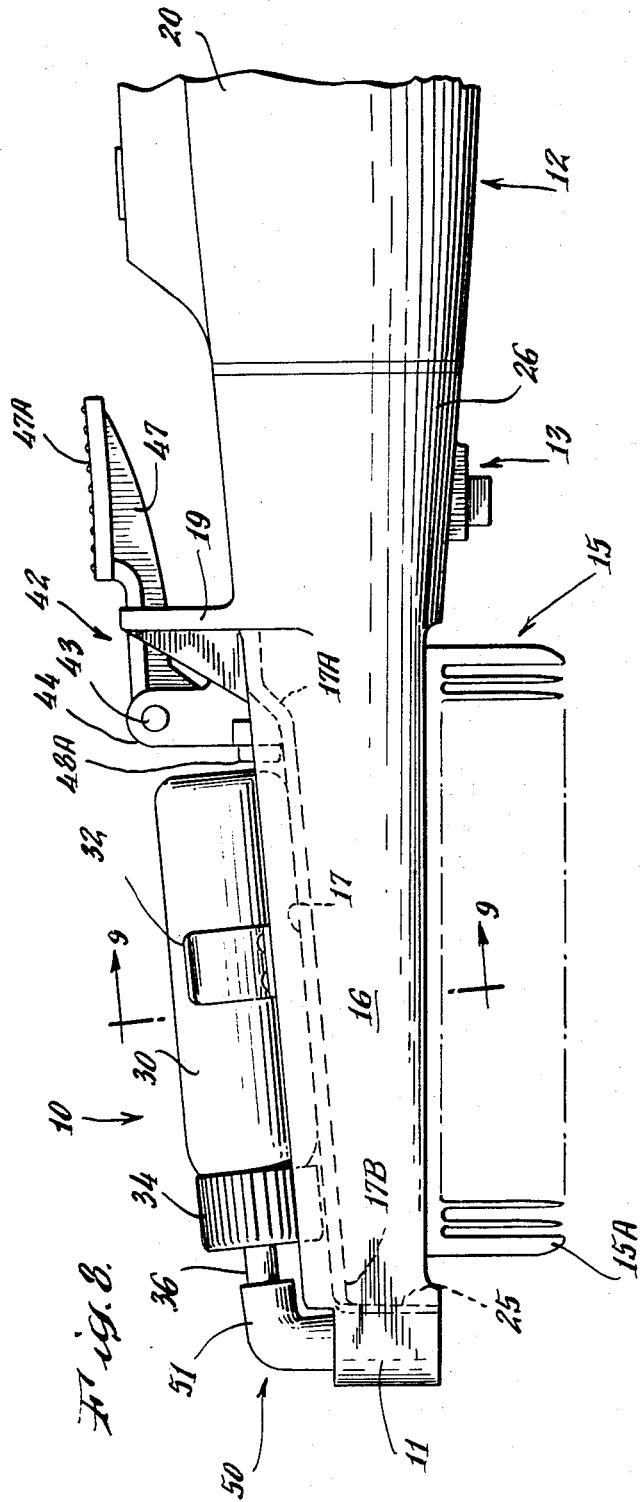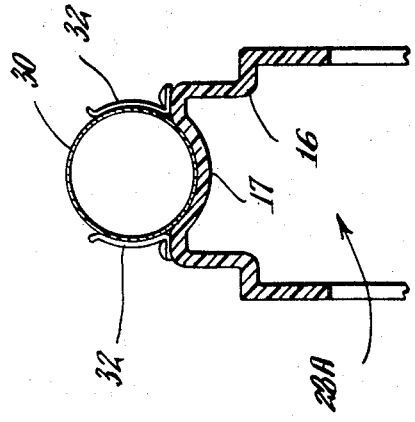

United States Patent Office 3,714,950
Patented Feb. 6, 1973

3,714,950
SPRAY APPARATUS
Aivars Miska, Bridgeport, and Howard L. Selman, Niantic, Conn., assignors to Sperry Rand Corporation, New York, N.Y.
Filed May 12, 1971, Ser. No. 142,513
Int. Cl. A45d 24/22
U.S. Cl. 132—112          6 Claims

ABSTRACT OF THE DISCLOSURE

Spray apparatus for apparatus of the type which includes a source of supply of hot air and a hair grooming implement holder connectable to the source, wherein the holder is adapted to carry a hair grooming implement and guide hot air from the source laterally of the implement for heating the user's hair. The spray apparatus includes an elongated base upon which a liquid carrying container provided with a dispensing tube may be mounted, a nozzle assembly connected to one end of the base includes a conduit and liquid atomizing apparatus, and container moving apparatus connected to the other end of the base. The atomizing apparatus terminates one end of the conduit with an exit orifice for directing liquid, as a spray, towards the user's hair. The container moving apparatus is operable to move the container towards the other end of the conduit for dispensing liquid from the container through the dispensing tube and into the conduit for flow via the atomizing apparatus to the exit orifice.

BACKGROUND AND SUMMARY OF THE INVENTION

This invention is concerned with spray apparatus for apparatus of the type which includes a portable source of supply of hot air associated with hair grooming apparatus. More particularly, the invention is concerned with spray apparatus in combination with a portable supply of hot air, such as a hand held housing within which a heating element and motor driven fan are mounted with provision for connecting them to a supply of electrical power, and hair grooming apparatus, such as a hair grooming implement holder for carrying a grooming implement and guiding hot air from the associated source laterally of the length of the implement.

Oftentimes it is desirable to users of hair grooming apparatus to apply a liquid to their hair during the course of grooming the same for immediately treating, dressing, tinting and/or wetting their hair. To meet this need, we have devised an arrangement of apparatus which allows users to intermittently or simultaneously apply hot air and a liquid to their hair, during the course of grooming the same.

The invention provides spray apparatus in combination with apparatus of the type which includes a source of supply of hot air and a hair grooming implement holder connectable to the source, wherein the holder is adapted to carry a hair grooming implement and guide hot air from the source laterally of the implement for heating the user's hair. The spray apparatus comprises an elongated base upon which a liquid carrying container provided with a dispensing tube may be mounted, nozzle means connected to one end of the base including a conduit and liquid atomizing means, the liquid atomizing means terminating one end of the conduit and providing an exit orifice for directing liquid, as a spray, toward the user's hair, and container moving means connected to the other end of the base, the moving means operable to move the container towards the other end of the conduit to dispense liquid from the container through the dispensing tube and into the conduit for flow via the atomizer means to the exit orifice.

BRIEF DESCRIPTION OF THE DRAWINGS

FIG. 1 is a perspective view of apparatus embodying the invention;
FIG. 2 is a top plan view of the apparatus with the cover shown in section;
FIG. 3 is a side elevation of the apparatus with the cover shown in section;
FIG. 4 is a section of FIG. 2, taken substantially along the line 4—4;
FIG. 5 is an enlarged view taken substantially along the line 5—5 of FIG. 4;
FIG. 6 is a section of FIG. 2, taken substantially along the line 6—6;
FIG. 7 is a section of FIG. 6, taken substantially along the line 7—7;
FIG. 8 is a side elevation of the apparatus in modified form; and
FIG. 9 is a section of FIG. 8, taken substantially along the line 9—9.

DESCRIPTION OF THE PREFERRED EMBODIMENTS

Referring now to the drawings, wherein like reference numerals designate like or corresponding parts throughout the several views, the spray apparatus 10 is shown cooperatively associated with a portable source of supply of hot air 12 and a hair grooming implement holder 15 of the type which includes a base 16 having means for removably connecting a hair grooming implement 15A thereto.

In arrangements of the type shown, the source of supply of hot air 12 is a hand held unit which generally includes an open-ended housing 20 within which an electrically energizable fan and air heating element are mounted with provision for connecting them to a source of supply of electrical power. One of the open ends of the housing acts as the air inlet into the unit, and the other, the air outlet 22. When energized, ambient air is carried into the heating unit's housing by the fan, heated by the heating element in transit through the housing, and discharged through outlet 22.

The hair grooming implement holder 15 is removably connectable to the outlet 22 for replacement and cleaning purposes. As shown in FIGS. 2-4 and 7, the base 16 has a body portion of elongated, inverted, U-shaped cross-section, which has one end terminated by a wall 25 and the other end by a conduit 26. The conduit and the portion of the heating unit's housing which forms the outlet 22 are shaped to have mating surfaces of complementary configuration, and are preferably connected together by means of a latch, such as the latch partially shown in FIG. 3, at 13. To promote the flow of hot air from the heating unit into close proximity with hair grooming implement, the base partially encloses the hair grooming implement. The body portion forms a longitudinally extending recess 28 (FIGS. 3, 4 and 7) within which the grooming implement is mounted. When connected to the heating unit for use, the implement holder's housing acts as an extension of the heating unit, with the grooming implement partially lengthwise cradled within the aforesaid recess. Since the wall 25 closes the free end of the holder, the body portion tends to direct the hot air laterally of the length of the implement as back pressure develops in the air stream due to the presence of wall. One or more state of the art air-deflectors may also be connected to the base, within the recess, to promote this effect. In operation, hot air from the heating unit thus enters the hair grooming implement holder through its rearward end 26 and flows to the grooming implement through recess 28 exiting the grooming device directed towards the user's hair.

The spray apparatus 10 preferably includes a portion of the base 16 of the implement holder; means for movably confining a liquid carrying container 30 to movement on the base; a lever assembly 18 (FIG. 6) for moving the container endwise of the base; and, a nozzle 50 (FIG. 4) through which liquid from the container is discharged.

In the preferred embodiment, rather than provide a separate base for the spray apparatus, with means for connecting the same to the base of the implement holder of the type hereinbefore described, the base of the holder has been modified to also act as a base for the spray apparatus. As shown in FIGS. 4 and 7, the base of the spray apparatus is the open-ended, elongated, concave portion 17 of the base 16; a portion having an upright, U-shaped cross-section. As shown in FIG. 3, end 17A of the base 17 merges into the rearward end of the holder; and end 17B incorporates the holder's forward end wall 25. Preferably, end 17B terminates the forward end of the holder with a substantially cylindrically-shaped tube 11 into which the nozzle 50 is insertable.

In the embodiment shown in FIGS. 1–7, a cover 31 which is pivotally connected to end 17B of the base 17 by means of a lug 13 which extends from the tube 11 is provided to enclose the bottle, nozzle, and most of the lever assembly in an aesthetically appealing compartment while at the same time providing the means for confining the bottle to movement on the base. The free end of the cover describes an inverted U-shaped opening which is closed, when the cover is closed, by a slotted supporting plate 19. Plate 19 extends upwardly from the end of the base 17 and is provided with a slot to accommodate motion of the rearwardly extending leg of the lever. Ridge 32 (FIGS. 2 and 3), a portion of the cover which is shaped like an inverted yoke, prevents lateral but not forward or rearward motion of the bottle on the base when the cover is closed.

In the embodiment shown in FIGS. 8 and 9, clips 32 are provided for confining the liquid carrying container to movement on the base. The clips capture the container with sufficient force to prevent its lateral displacement during normal use of the grooming implement, while at the same time allowing for its endwise displacement toward and away from the nozzle 50 for intermittently discharging its contents.

As shown, the container is a refillable bottle having its open end closed by a cap 34 which is provided with a dispensing tube 36 extending from its center. The cap is threadably connected to the bottle for ease of refilling and cleaning. Liquid from the bottle is discharged in response to moving the bottle's dispensing tube inwardly of the bottle. To do so, the bottle is moved towards the nozzle.

The lever assembly is provided to move the bottle toward the nozzle. As is best shown in FIGS. 6 and 7, the lever assembly includes a lever 42, pivot pin 43, and lever yoke 44. Lever 42 is an L-shaped member having its apex pivotally connected to the upper ends of the legs of the yoke 44 via the pivot pin. In the preferred embodiment, the yoke 44 is formed by a pair of parallel posts extending upwardly from the base of the spray apparatus. The upper ends of the posts are provided with opposed openings 46 to receive the opposite ends of the pivot pin 43. One leg 47 of the lever 42 extends horizontally from the pivot pin and towards the heating unit, and the other leg 48 extends downwardly from the pin and towards the base of the bottle. The free end of the downwardly extending leg is provided with a cylindrically-shaped pressure pad 48A and the free end of the rearwardly extending leg provided with a ridged upper surface 47A. In practice, the ridged end of the rearwardly extending leg is manually depressed by the user to pivot the lower end of the other leg toward the base of the bottle, whereupon the pressure pad 48A is forced against the base of the bottle to force the dispensing tube against the nozzle 50.

As shown in FIGS. 4 and 5, the nozzle includes an open-ended, L-shaped, conduit 51, which is removably connectable to the free end 17B of the base of the spray apparatus to allow for replacement and cleaning. The inner diameter of tube 11 and the lower portion of the outer diameter of the conduit 51 are sized for slidable engagement with one another. Preferably, the upper end of the conduit 51 is provided with stop 51A against which the bottle's dispensing tube 36 normally bears; and the lower end is terminated by an atomizer 70 (FIG. 5).

As shown in FIG. 4, the outer diameter of the bottle's dispensing tube 36 and inner diameter of the upper end of the nozzle's conduit 51 are also dimensioned for slidable engagement with one another. The dispensing tube is inserted in place within the conduit when the bottle is placed on, or clipped to, the base of the spraying apparatus. When so mounted, the end of the dispensing tube is normally positioned to bear against the stop 51A, a ledge formed in the inner surface of the nozzle's conduit 51. When the lever is depressed as hereinbefore described, motion of the bottle towards the nozzle causes the dispensing tube to be plunged toward the base of the bottle, causing liquid from the bottle to be discharged into the nozzle. The liquid enters the nozzle's conduit and flows downwardly to the atomizer 70.

As shown in FIGS. 4 and 5, the atomizer includes a disc-like solid element 72 having a channel 73 formed in its otherwise circularly-shaped outer surface 74. The channel 73 extends lengthwise of the element to provide a passageway between the element and the conduit 51 through which fluid from within the conduit may pass endwise of the element 72. As shown in FIG. 5, the face of the lower end of the element is provided with a cylindrically-shaped channel 76 and three equi-angularly spaced, radically extending, arcuately-shaped channels 76A, the latter extending from the center of the element to channel 76.

The upper end of the atomizer element is of slightly larger diameter than the lower end to provide a cylindrically-shaped space about the lower end of the element when it is inserted into the conduit 51 a space which is sized to accommodate placing a cylindrically-shaped cap 60 having a closed lower end 61 over the lower end of the atomizer element. The cap is provided with a centrally located circular orifice, through which fluid from the three channels 76A may exit the atomizer. In practice, the atomizer element is held in place by the cap. The inner diameter of the lower end of the nozzle tube and outer diameter of the atomizer cap are dimensioned for press-fitting together, and the cap is insertable to a sufficient depth within the aforesaid space to hold the nozzle element stationary against rotational forces.

When fluid from the bottle enters the conduit 51 it flows downwardly to the atomizer; then lengthwise of the atomizer element via the passageways formed by the upper end of channel 73 and inner wall of conduit 51, and the lower end of channel 73 and inner wall of the atomizer cap 60; then laterally of the lower end of the atomizer element via the four passageways formed by channels 76 and 76A and the inner wall of the lower end of the atomizer cap; and exits through the end cap orifice 62. The various passageways for liquid flow around the atomizer element to the exit orifice are constructed and arranged to cause sufficient turbulence in the flow of liquid to cause it to be dispersed from the exit orifice in the form of a spray.

What is claimed is:

1. Spray apparatus in combination with apparatus of the type which includes a source of supply of hot air and a hair grooming implement holder connected to the source, said holder having a hair grooming implement attached thereto, said implement holder guiding hot air from the source laterally of the implement for heating the hair, the spray apparatus comprising:
- (a) an elongated base upon which a liquid carrying container provided with a dispensing tube may be mounted;
- (b) nozzle means connected to one end of the base including a conduit and liquid atomizing means, the liquid atomizing means terminating one end of the conduit and providing an exit orifice for directing liquid, as a spray, toward the hair; the atomizing means cooperatively connected with said one end of the conduit and constructed and arranged to form a plurality of passageways at said one end of the conduit for promoting turbulence in the flow of liquid through the exit orifice, thereby ensuring that the liquid is dispersed from the exit orifice in the form of a spray; and,
- (c) container moving means connected to the other end of the base, the moving means operable to move the container towards the other end of the conduit to dispense liquid from the container through the dispensing tube and into the conduit for flow via passageways of the atomizing means to the exit orifice.

2. The spray apparatus according to claim 1 wherein the base is a portion of the hair grooming implement holder.

3. The spray apparatus according to claim 1 wherein the nozzle means is removably connected to the base.

4. The spray apparatus according to claim 1 wherein the container moving means includes a manually operable lever pivoted to the base.

5. The spray apparatus according to claim 1 further comprising,
- (d) means for confining the container to movement on the base.

6. The spray apparatus according to claim 1 further comprising,
- (d) the liquid carrying container and dispensing tube, the container being refillable, the tube being endwise movable into the container for dispensing liquid therefrom, and a stop at the other end of the conduit for stopping motion of the dispensing tube while the container is in motion towards said other end of the conduit, relative motion of the tube into the container causing liquid to be dispensed therefrom.

References Cited

UNITED STATES PATENTS

| | | | |
|---|---|---|---|
| 718,054 | 1/1903 | Head | 132—114 |
| Re. 25,585 | 5/1964 | Birch et al. | 132—116 |
| 3,145,691 | 8/1964 | Yates | 119—83 |

LOUIS G. MANCENE, Primary Examiner

G. E. McNEILL, Assistant Examiner